(12) United States Patent
Faulmann et al.

(10) Patent No.: US 6,248,148 B1
(45) Date of Patent: Jun. 19, 2001

(54) METHOD FOR TREATING AMMONIA-CONTAINING ORGANIC WASTE

(75) Inventors: Ervin Louis Faulmann, Maumee; Terry J. Logan, Columbus, both of OH (US)

(73) Assignee: N-Viro International Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,205

(22) Filed: May 1, 1998

(51) Int. Cl.[7] .................. C05F 3/00; C05F 1/00; C02F 3/00
(52) U.S. Cl. .................. 71/11; 71/12; 71/15; 71/21; 210/610; 210/611; 210/903
(58) Field of Search .................. 71/11, 12, 15, 71/21; 210/718, 724, 750, 903, 610, 611

(56) References Cited

U.S. PATENT DOCUMENTS

| | | | |
|---|---|---|---|
| 3,877,920 | 4/1975 | Carlberg | 71/21 |
| 4,554,002 | 11/1985 | Nicholson | 71/12 |
| 4,781,842 | 11/1988 | Nicholson | 210/751 |
| 4,793,927 | 12/1988 | Meehan et al. | 210/751 |
| 4,902,431 | 2/1990 | Nicholson et al. | 210/751 |
| 4,997,572 * | 3/1991 | Wurtz | 210/710 |
| 5,143,481 | 9/1992 | Schumacher et al. | 405/129 |
| 5,277,826 | 1/1994 | Burns et al. | 210/751 |
| 5,417,861 | 5/1995 | Burnham | 210/609 |
| 5,679,262 | 10/1997 | Girovich et al. | 210/751 |

FOREIGN PATENT DOCUMENTS

4444032 * 5/1996 (DE) .

OTHER PUBLICATIONS

D.L. Day and T.L. Funk, *Processing Manure: Physical, Chemical and Biological Treatment*, printed in Animal Waste Utilization: Effective Use of Manure as a Soil Resource, 243–279 (Ann Arbor Press 1998).

Michael B. Jenkins et al., *Inactivation of Cryptosporidium parvum Oocysts by Ammonia*, 64 Appl. and Env. Microbiol. 784–788 (1998).

P.A. Moore, Jr. et al., *Evaluation of Chemical Amendments to Reduce Ammonia Volatilization from Poultry Litter*, 75 Poultry Sci. 315–320 (1996).

P.A. Moore, Jr. and D.M. Miller, *Reducing Phosphorus Solubility in Poultry Manure with Aluminum, Calcium and Iron Amendments*, 23 J. Environ. Qual. 325–330 (1994).

* cited by examiner

Primary Examiner—Steven P. Griffin
Assistant Examiner—Maribel Medina
(74) Attorney, Agent, or Firm—Kenyon & Kenyon

(57) ABSTRACT

A method is described for disinfecting and deodorizing animal manures and other organic wastes to produce a pasteurized, granular product for use as a soil amendment. The solids content of the animal manure is raised to a predetermined level to create air-filled pore space, and the pH is raised sufficient to liberate endogenous gaseous ammonia in the air-filled pores for a predetermined time. The level of gaseous ammonia is sufficient to significantly destroy pathogens in the manure.

25 Claims, 3 Drawing Sheets

METHOD FOR TREATING AMMONIA-CONTAINING ORGANIC WASTE

BACKGROUND OF THE INVENTION

The present invention relates generally to the field of waste management, and in particular to a method for treating ammonia-containing organic waste, including but not limited to animal manures. Embodiments of the present invention can be applied to destroy pathogens and reduce noxious odors in such organic waste, rendering the treated waste material safe for storage and application to land as, for example, a fertilizer, liming agent or soil amendment.

Since ancient times, animal manures were recycled back to the land that provided the animal feed, thereby completing the nutrient cycle. As animal production became intensified, the cycle was broken, with chemical fertilizers increasingly used to produce animal feed and the animal manure accumulating at the point of production as an unwanted waste. In many parts of the U.S., Europe and other countries, manure production at large, confined animal feeding operations (CAFOs), primarily poultry, swine, dairy and beef, has resulted in odor, nutrient runoff and pathogen food-chain contamination problems. Until the present, little attention has been placed on the processing of animal manure to address these problems, with most attention being placed on so-called "best management practices" to contain the manure and ensure that it is applied at agronomic rates. Because of the large concentrations of animal manures at CAFOs, generally well in excess of local needs, the need has arisen to treat manures so that they can be easily stored without causing odor or nutrient leaching problems, to greatly reduce pathogen levels and protect against food-chain contamination, and to create products that have a wide range of utility as fertilizers and soil amendments.

A wide range of technologies were developed to treat wastewater residuals and sewage sludges for pathogen destruction and odor control in response to the large public works expenditures for wastewater treatment in the U.S. in the 1960s and 1970s. Prominent among these were technologies that used alkaline reagents to destroy pathogens, to reduce odors, and to solidify and granulate dewatered sewage sludges to make products that could be used beneficially. The standards that these technologies had to meet were the U.S. EPA regulations for pathogen reductions (see 40 C.F.R. §§ 257, 503) and vector attractions (40 C.F.R. § 503).

A traditional approach to alkaline stabilization of sewage sludges has been the use of lime (CaO) to raise pH to around 12 or to produce heat by exothermic hydrolysis. Alternative technological approaches have involved the use of less expensive alkaline mineral by-products. Patents exemplifying such approaches include U.S. Pat. No. 4,554,002 to Nicholson; U.S. Pat. No. 4,781,842 to Nicholson; U.S. Pat. No. 4,902,431 to Nicholson et al.; and U.S. Pat. No. 5,277,826 to Burns et al. Such patents teach the use of a range of alkaline materials to raise pH to around 12 and to increase total solids as a means of destroying pathogens.

In addition, the use of ammonia to kill pathogens in sewage sludge is disclosed in U.S. Pat. No. 4,793,927 to Meehan et al. Meehan describes the addition of ammonia-containing compounds to sewage sludge as an agent to destroy bacterial, parasitic and viral pathogens within the sludge matrix. U.S. Pat. No. 5,143,481 to Schumacher et al. shows how fluidized bed combustion residue (FBCR), or fly ash, containing CaO can be used to treat sewage sludges by producing heat in an exothermic reaction. U.S. Pat. No. 5,679,262 to Girovich et al. describes the use of mineral by-products to reduce the use of CaO in order to kill pathogens and achieve a dry product. Finally, U.S. Pat. No. 5,417,861 to Burnham teaches how a combination of surviving microflora, salt levels and solids content can provide long-term stability to bioorganic or wastewater sludges.

Despite these extensive efforts directed at the treatment of wastewater and sewage sludge, no comparable technologies have been developed for the treatment of ammonia-containing organic waste such as animal manures. Manure treatment, for example, has historically included only aerobic and anaerobic digestion of liquid manures, while some beef and poultry manure is composed (see D. L. Day and T. L. Funk, *Processing Manure: Physical, Chemical, and Biological Treatment* (1998) (published in J. L. Hatfield and B. A. Stewart, *Animal Waste Utilization: Effective Use of Manure as a Soil Resource* (Ann Arbor Press 1998)). The only significant known approach to chemical stabilization of manure is the addition of calcium, iron or aluminum salts to poultry manure to reduce ammonia emissions and to immobilize soluble phosphorus (see P. A. Moore, Jr. et al. and D. M. Miller, *Reducing Phosphorus Solubility in Poultry Manure with Aluminum, Calcium and Iron Amendments*, J. Environ. Qual., vol. 23, 325–330 (1994)); and U.S. Pat. No. 3,877,920 to Carlberg, which taught the use of fly ash to deodorize animal manures. None of these approaches, however, deal with chemical treatment of animal manure for pathogen destruction.

With respect to pathogen destruction in animal manures, M. B. Jenkins et al., *Inactivation of Cryptosporidium parvum Oocysts by Ammonia*, Appl. and Env. Microbiol., Vol. 64, 784–788 (1998), shows that free ammonia-containing solutions can destroy *Cryptosporidium parvum* oocysts in liquid media and suggests that ammonia in manures might be used to kill oocycsts of this organism, but this reference only discusses the use of free ammonia in solution. Large-scale introduction of aqueous ammonia to animal manures presents a host of practical problems, including, but not limited to problems associated with the handling of large quantities of a potentially-hazardous liquid. The introduction of liquids to manure is counterproductive because manures are inherently wet and need to be dewatered for effective handling and storage. Moreover, aqueous ammonia is caustic, relatively expensive and difficult to handle.

In view of the foregoing, it is apparent that there is a need for a safe, effective and economical method for disinfecting and deodorizing animal manures and other organic wastes that takes advantage of the inherent endogenous ammonia in such waste materials.

SUMMARY OF THE INVENTION

The present invention is directed to methods for disinfecting and deodorizing animal manures and other organic wastes containing ammonia. In accordance with a particular embodiment, the solids content of a sample of animal manure is raised to an approximate minimum of 30% so as to create air-filled pore space. In addition, the pH of the animal manure is raised to an approximate minimum of 9.5 to liberate endogenous gaseous ammonia in the air-filled pores for at least 1 hour, the level of gaseous ammonia being sufficient to reduce *E. coli* levels to less than $3.3*10^2$ colony forming units/gram (dry weight) and Salmonella levels to less than $6.7*10^2$ colony forming units/gram (dry weight), and to significantly reduce the levels of viruses and parasites. This method produces a granular, deodorized product suitable for use as a soil amendment.

DETAILED DESCRIPTION

The present invention is directed to methods for treating animal manures and other ammonia-containing organic wastes. In accordance with particular embodiments described below, such organic waste is disinfected and deodorized to produce a pasteurized, granular product suitable for use as a soil amendment. Unlike known approaches, methods in accordance with the present invention take advantage of the superior effectiveness of gaseous ammonia in achieving pathogen kill as compared to aqueous ammonia.

Ammonia gas is a known chemical agent for achieving pathogen kill, as described in U.S. Pat. No. 4,793,972, issued to Meehan et al. for an invention involving the treatment of sewage sludge in which ammonia was added and the pH was raised to near 12. In addition, the role of ammonia as a disinfectant for *Cryptosporidium parvum* has been recognized in, for example, M. B. Jenkins et al., *Inactivation of Cryptosporidium parvum Oocysts by Ammonia*, Appl. and Env. Microbiol., Vol. 64, 784–788 (1998), but such studies only considered free ammonia dissolved in water and did not identify the superior role of gaseous ammonia compared to dissolved ammonia in pathogen kill. In a material that contains solids and water, such as animal manure, and at the normal pHs of animal manure, any ammonia in the material or added to the material (including as taught by Meehan) would exist as a dissolved gas or as ammonium ion.

Ammonia gas has a high solubility in water, and except at high pHs exists as the ammonium ion. The equilibrium between dissolved ammonia ($NH_{3(1)}$) and ammonium ion ($NH_4^+$) is given by the equation:

$$NH_{3(1)} + H^+ \leftrightharpoons NH_4^+ \tag{Eq. 1}$$

This equation shows that the amount of dissolved ammonia increases as the pH increases (i.e., the concentration of H+ decreases). To illustrate, FIG. 1 maps the percentage of ammonia as dissolved ammonia as a function of pH, showing that free ammonia ($NH_3$) is produced when pH is greater than about 9.5 and reaches a maximum near pH 12.

Figure 1:
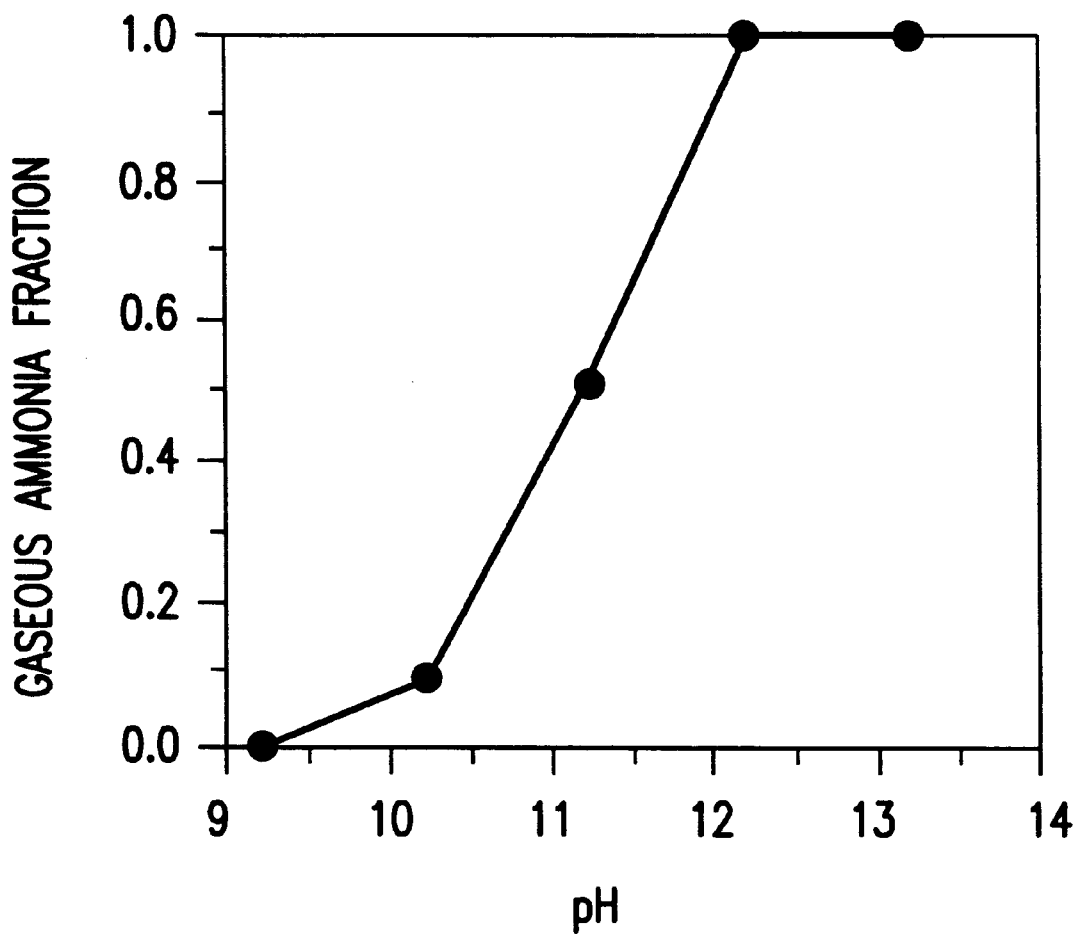
FIG. 1 is a graph illustrating the effect of pH on ammonia gas production.

In view of the relationship illustrated in FIG. 1, embodiments of the present invention are directed to treatment processes (1) in which pH is raised to a level sufficient to release significant endogenous ammonia from the manure, yet low enough not to release so much ammonia as to cause an odor problem, (2) that minimize the loss of fertilizer nitrogen, and (3) that do not significantly add to ammonia air emissions. Such treatment processes include increasing the solids content of the manure so as to increase the air-filled pore space and to create a reservoir in which gaseous ammonia can be liberated and can contact and kill pathogens in the manure. Increasing the solids content enhances the killing effect of the endogenous ammonia in the manure and reduces the need to raise pH to the very high levels (e.g., near 12) used in previously known waste treatment approaches. By so doing, the odor problems associated with large ammonia releases and the loss of fertilizer nitrogen can be minimized.

Figure 2:
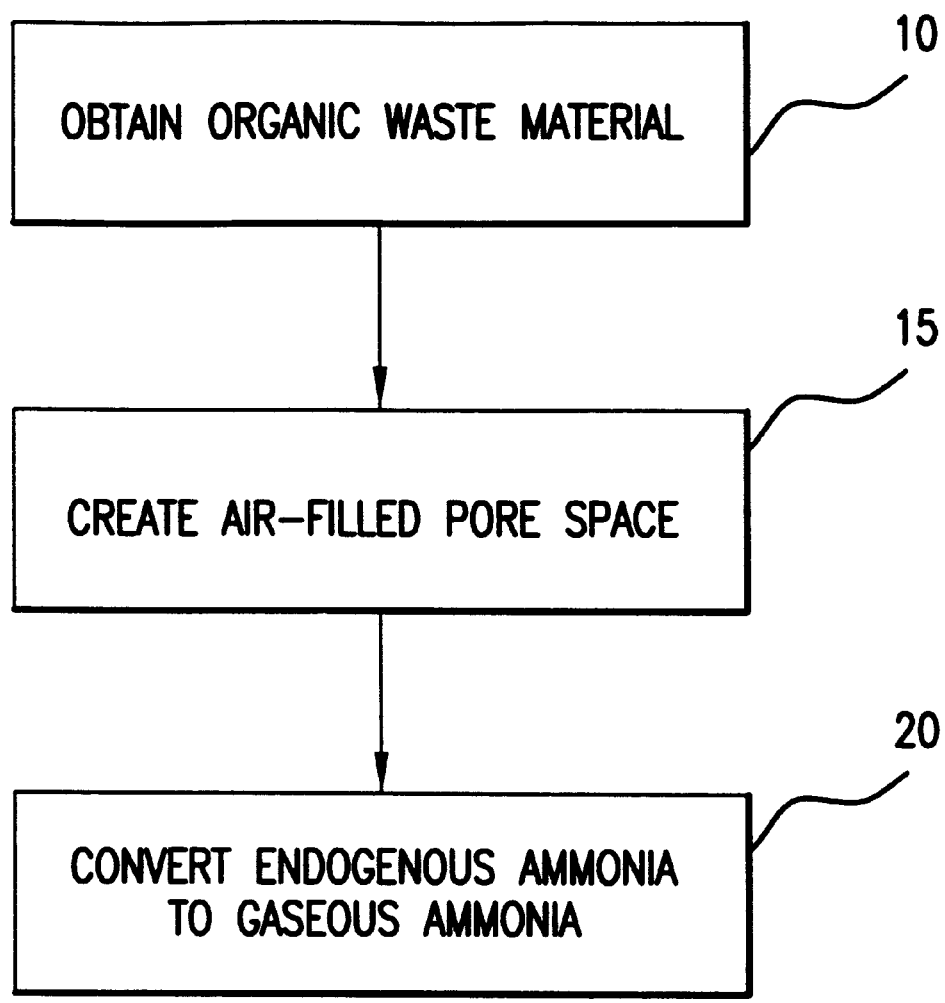
FIG. 2 is a flow diagram illustrating a general method for treating ammonia-containing organic waste in accordance with an embodiment of the present invention.

FIG. 2 illustrates a general method for treating ammonia-containing organic waste in accordance with an embodiment of the present invention. Once a collection of organic waste material is obtained (Step 10), the method of this embodiment generally involves creating air-filled pore space within the organic waste material (Step 15). This can be done, for example, by increasing the solids content of the organic waste to at least approximately 30%. A portion of the endogenous ammonia is then converted to gaseous ammonia in the air-filled pore space (Step 20). This can be done, for example, by raising the pH of the organic waste material to a minimum of approximately 9.5.

Figure 3:
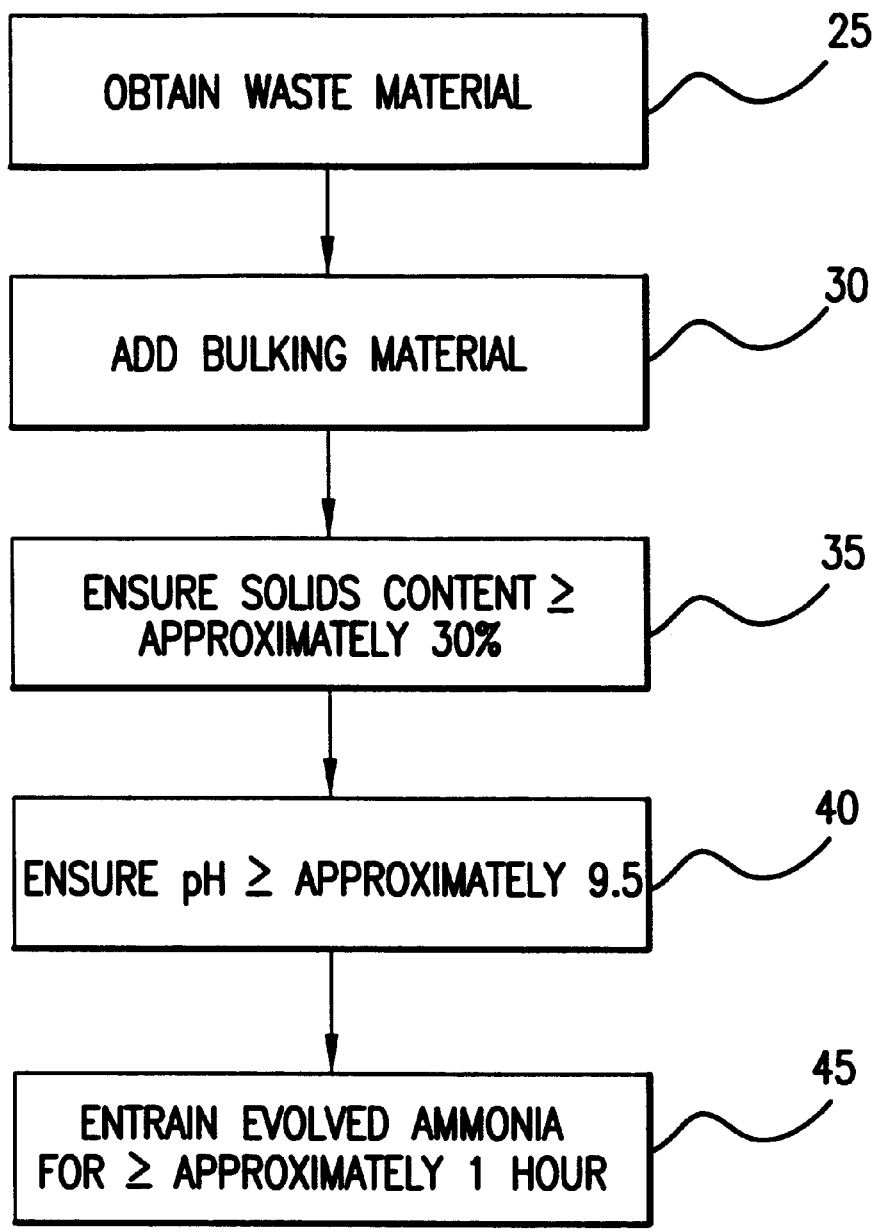
FIG. 3 is a flow diagram illustrating a method for treating ammnonia-containing organic waste in accordance with another embodiment of the present invention.

To illustrate a specific implementation of an embodiment such as that illustrated in FIG. 2, consider a case in which a 5-ton collection of chicken manure (e.g., removed from a poultry house) is to be treated. Such chicken manure typically has a solids content of approximately 20% and a pH of approximately 6.8. Referring now to FIG. 3, once the collection of chicken manure is obtained (Step 25), bulking material is added to the semi-liquid collection of chicken manure using, for example, a mixing device such as an auger-mixer or a front-end loader (Step 30). A wide variety of materials are suitable for use as a bulking material including, for example, fluidized boiler ash (a by-product of industrial air scrubbing processes). The bulking material is added in an amount sufficient to raise the solids content of the collection to approximately 30% or above (Step 35). In this example, approximately 1,400 pounds of fluidized boiler ash is generally sufficient. During the mixing process, it is desirable to monitor the pH of the mixture (Step 40). In some cases, it may be necessary to mix in additional alkaline materials (e.g., lye, lime, or similar material) to achieve the desired pH of approximately 9.5 or above, although the alkaline nature of the bulking material itself may be sufficient. The mixture of manure and bulking material is then placed in an enclosed area (e.g., a bunker), or even simply covered with a tarp, for a period of approximately 1 hour or more to entrain the evolved ammonia (Step 45). At the completion of this incubation period, the mixture can be safely used for spreading on agricultural fields, mixed with other materials for soil blends, and many other similar uses.

The level of gaseous ammonia produced by a method such as those shown in FIG. 2 and FIG. 3 will generally be sufficient to reduce *E. coli* levels to less than $3.3*10^2$ colony forming units/gram (dry weight) and Salmonella levels to less than $6.7*10^2$ colony forming units/gram (dry weight), and to significantly reduce the levels of viruses and parasites. Moreover, the method produces a product that is granular and deodorized for use as a soil amendment.

All animal manures contain significant quantities of ammonia. Table 1 below summarizes the total ammonia-nitrogen ($NH_3$—N) contents of different types of animal manures. This data indicates that all animal manures will typically contain enough total ammonia to provide gaseous ammonia for disinfection, under the appropriate process parameters of pH, solids and time of treatment, in accordance with embodiments of the present invention.

TABLE 1

| Average Ammonia-Nitrogen in Animal Manures | |
| --- | --- |
| Animal Type | Ammonia-Nitrogen (mg/kg)* |
| Beef cattle | 3500 |
| Dairy cattle | 2000 |
| Poultry | 130000 |
| Swine | 3000 |
| Turkey | 8500 |
| Sheep | 2500 |

TABLE 1-continued

Average Ammonia-Nitrogen in Animal Manures

| Animal Type | Ammonia-Nitrogen (mg/kg)* |
|---|---|
| Horses | 2000 |

*Assumes no bedding.
Source: Bull, Ohio Livestock Manure and Wastewater Management Guide 604 (Ohio State University 1992).

Ammonia gas has a very high solubility in water (~32% by weight). This is represented quantitatively by the Henry's Law Constant for ammonia of $5.76 \times 10^4$ mol m$^{-3}$ atm$^{-1}$. This value is 1700 times greater than that of carbon dioxide and almost 50 times greater than that of sulfur dioxide. Eq. 1 and FIG. 1 show that ammonia can be generated by raising pH above about 9.5, but if the manure is too wet, there will be enough free water to dissolve the ammonia and prevent free contact of ammonia gas with manure pathogens. When a dry mineral material like fly ash, cement kiln dust or lime kiln dust is mixed in sufficient quantities, or the manure is otherwise dried, free water in the manure is absorbed by the solids or otherwise removed, and pore space is created in the mixture. If the solids content of the mixture is high enough, there will be enough air-filled pore space in the mixture for ammonia gas to be liberated within the material when the pH is raised. Converting free ammonia from the dissolved to the gaseous form increases the effectiveness of the endogenous ammonia in the manure in killing pathogens. Fly ash addition increases solids content, total porosity and air-filled porosity, thereby increasing the amount of gaseous ammonia in the manure. If an alkaline material is used that generates heat through exothermic hydrolysis with water in the manure, a lower solids content and pH may be acceptable to achieve the same level of gaseous ammonia in the air-filled pore space.

The following examples illustrate the effectiveness of organic waste treatment methods in accordance with embodiments of the present invention. In a first example, increasing the pH of sterile chicken manure, seeded with *E. coli* and Salmonella, by the addition of NaOH, led to an increased evolution of ammonia gas into the headspace and a decrease in the survival of the seeded bacteria. This bactericidal effect was enhanced when the chicken manure contained less water (i.e., more solids). Initial reaction mixtures of 20 grams of sterile chicken manure, seeded with overnight cultures of *E. coli* and Salmonella, were adjusted to 30% solids or 15% solids with the addition of either 5 M NaOH and water (pH 9.5 reactions) or sterile water alone (pH<8.5 reactions). The reaction mixtures were mixed extensively and split into 5 gram (30% solids) or 10 gram (15% solids) aliquots. The reaction tubes were then placed in a 30° C. incubator, tested for pH by electrode or placed in a 250 ml chamber for ammonia headspace analysis with ammonia-specific pull tubes. Tubes were removed from the incubator after 1 and 3 hours incubation and assayed for surviving *E. coli* (growth on *E. coli* Petrifilm (3M, Minneapolis, Minn.)) and Salmonella (black colony growth on XLD agar plates). The results are presented in Table 2.

TABLE 2

Effect of pH and % Solids on Survival of Seeded *E. coli* and *Salmonella* in Chicken Manure

| | | Headspace Ammonia | Bacterial CFU*/gram (dry weight) | | | | | |
|---|---|---|---|---|---|---|---|---|
| | | | Initial Inoculation | | 1 Hour Incubation | | 3 Hours Incubation | |
| Reaction | pH | (ppm) | E. coli | Salmonella | E. coli | Salmonella | E. coli | Salmonella |
| Chicken Manure - 15% solids | 7.9 | 430 | 3.1E + 04 | 2.5E + 04 | 1.2E + 04 | 1.0E + 05 | 1.1E + 04 | 4.0E ++ 05 |
| Chicken Manure - 15% solids | 9.3 | 1540 | " | " | 4.7E + 03 | 1.0E + 05 | <3.3E + 02 | <6.7E + 02 |
| Chicken Manure - 30% solids | 8.3 | 180 | " | " | 6.7E + 03 | 1.0E + 05 | 7.7E + 03 | 6.7E + 04 |
| Chicken Manure - 30% solids | 9.3 | 1240 | " | " | <3.3E + 02 | <6.7E + 02 | <3.3E + 02 | <6.7E + 02 |

*Colony Forming Units

In a second example, increasing the pH of sterile swine manure, seeded with *E. coli* and Salmonella, by the addition of NaOH, led to an increased evolution of ammonia into the headspace and a decrease in the survival of the seeded bacteria. This bactericidal effect was enhanced when the swine manure contained less water (i.e., more solids). Initial reaction mixtures of 23.5 grams of sterile swine manure, seeded with overnight cultures of *E. coli* and Salmonella, were adjusted to 30% solids or 15% solids with the addition of either 5 M NaOH and water (pH 9.5 reactions) or sterile water alone (pH 8.8 reactions). The reaction mixtures were mixed extensively and split into 5 gram (30% solids) or 10 gram (15% solids) aliquots. The reaction tubes were then placed in a 30° C. incubator, tested for pH by electrode or placed in a 250 ml chamber for ammonia headspace analysis with ammonia-specific pull tubes. Tubes were removed from the incubator after 1 and 3 hours incubation and assayed for surviving *E. coli* (growth on *E. coli* Petrifilm (3M, Minneapolis, Minn.) and *Salmonella* (black colony growth on XLD agar plates). The results are presented in Table 3.

TABLE 3

Effect of pH and % Survival on the Survival of seeded

*E. coli* and *Salmonella* in Swine Manure

| Reaction | pH | Headspace Ammonia (ppm) | Bacterial CFU*/gram (dray weight) | | | | | |
|---|---|---|---|---|---|---|---|---|
| | | | Initial Inoculation | | 1 Hour Incubation | | 3 Hours Incubation | |
| | | | E. coli | Salmonella | E. coli | Salmonella | E. coli | Salmonella |
| Swine Manure - 15% solids | 8.8 | 130 | 3.1E + 06 | 3.2E + 06 | 1.0E + 06 | 6.2E + 05 | 1.3E + 06 | <1.0E + 07 |
| Swine Manure - 15% solids | 9.4 | 240 | " | " | 2.3E + 04 | 6.7E + 02 | 4.3E + 02 | <6.7E + 02 |
| Swine Manure - 30% solids | 8.8 | 280 | " | " | 9.9E + 05 | 1.3E + 06 | 5.5E + 05 | <1.0E + 07 |
| Swine Manure - 30 solids | 9.3 | 520 | " | " | 8.7E + 02 | <6.7E + 02 | <3.3E + 02 | <6.7E + 02 |

*Colony Forming Units

These examples show that the three process variables used in accordance with embodiments of the present invention—pH, solids and time—have a synergistic effect promoting the destruction of *E. coli* and Salmonella in animal manures to non-detectable levels. The total content of the manure does not change during processing, only the form of the ammonia and the contact between gaseous ammonia and pathogens in the manure. At the lower pH, increasing the solids content had little effect on destruction of *E. coli* and Salmonella after one hour. When pH was raised to near 9.5, there was measurable pathogen destruction. However, substantially complete destruction of *E. coli* and Salmonella only occurred when pH was raised to near 9.5 and solids content was raised to 30%. In the case of the swine manure, because of the lower endogenous ammonia than in chicken manure, a three hour process time was required to reduce *E. coli* to non-detectable levels. These results also show a strong association between gaseous endogenous ammonia and pathogen destruction. This process for pathogen destruction should be applicable to all ammonia-containing organic wastes.

Persons skilled in the art of waste management will recognize that waste treatment methods in accordance with embodiments of the present invention provide significant advantages over known processes that use higher pH. Among these advantages are limiting ammonia release, thereby limiting hazards to workers from airborne ammonia, and keeping residual ammonia with the end product, thereby maintaining the fertilizer value of the end product. In addition, application of methods in accordance with such embodiments makes it easier to reduce the pH of the end product after processing, thereby enhancing its utility in land applications for soils that are already alkaline.

Although the present invention has been described principally with reference to embodiments for treating animal manures, persons skilled in the art will recognize that it is equally applicable to other types of ammonia-containing animal wastes. For example, embodiments of the present invention may similarly be used to treat municipal wastewater sewage sludge, paunch manure, brewery sludge, and fermentation biomass wastes. Indeed, virtually any ammonia-containing organic waste material is amenable to beneficial treatment in accordance with embodiments of the present invention.

The foregoing is a detailed description of particular embodiments of the present invention. The invention embraces all alternatives, modifications and variations that fall within the letter and spirit of the claims, as well as all equivalents of the claimed subject matter. For example, manures with high initial solids content (e.g., poultry or beef cattle manure) may be treated by adding enough lime or caustic soda to raise the pH, while fly ash may be added to wetter manure (e.g., swine manure) to achieve the required solids content and pH. Likewise, a mixture of non-alkaline fly ash or other dry materials can be added to raise the solids content, and lime or caustic soda added to raise the pH. Mixing of the manure with the alkaline reagents may be accomplished with a variety of mixers (e.g., cement mixers, sewage sludge alkaline stabilization mixers, topsoil blenders), and the mixture may be held in a variety of enclosed vessels (e.g., plastic-covered windrows, silos, bunkers), depending on the scale of a particular operation. Persons skilled in the art will recognize from the foregoing detailed description that many other alternatives, modifications and variations are possible.

What is claimed is:

1. A method for treating organic waste material containing endogenous ammonia, said method comprising the steps of:
   creating air-filled pore space within the organic waste material;
   raising a pH level of the organic waste material to approximately 9.5 to convert a portion of the endogenous ammonia to gaseous ammonia; and
   retaining a substantial portion of the gaseous ammonia within the pore space for a period of at least approximately one hour, the pH level of the organic waste material remaining at approximately 9.5 during said period.

2. The method of claim 1, wherein the organic waste material has associated therewith a solids content, said step of creating air-filled pore space comprising increasing the solids content of the organic waste material.

3. The method of claim 2, wherein said step of creating air-filled pore space further comprises increasing the solids content to at least approximately 30%.

4. The method of claim 1, wherein the organic waste material comprises animal manure.

5. The method of claim 4, wherein the organic waste material further comprises manure from an animal selected from a group including beef cattle, dairy cattle, poultry, swine, turkeys, sheep, and horses.

6. The method of claim 4, wherein the organic waste material further comprises bedding material.

7. The method of claim 1, wherein the organic waste material comprises a material selected from a group including municipal wastewater sewage sludge, paunch manure, brewery sludge, and fermentation biomass wastes.

8. A method for treating organic waste material containing endogenous ammonia, the organic waste material having associated therewith a solids content and a pH level, said method comprising the steps of:
   ensuring a solids content of the organic waste material of at least approximately 30%; and
   raising the pH level of the organic waste material to approximately 9.5 and maintaining said pH level for a period of at least approximately one hour, wherein the solids content and pH level of the organic waste material cause endogenous ammonia to be converted to gaseous ammonia, a substantial portion of which is retained in pore space within the organic waste material for said at least approximately one hour.

9. The method of claim 8, further comprising the step of holding the organic waste material in a substantially closed space during said at least approximately 1 hour.

10. The method of claim 8, further comprising the step of maintaining the solids content of the organic waste material at approximately 30% or above during said at least approximately 1 hour.

11. The method of claim 8, wherein said step of ensuring a solids content of the organic waste material of at least approximately 30% comprises adding a mineral byproduct to the organic waste material.

12. The method of claim 11, wherein the mineral byproduct is selected from a group including fly ash, coal combustion ash, flue gas desulfurization by-product, cement kiln dust, wood ash, pulverized limestone, rock fines, spent water treatment lime, and gypsum.

13. The method of claim 12, wherein the mineral byproduct is an alkaline mineral byproduct and is added in a quantity sufficient to achieve said raising of the pH level of the organic waste material.

14. The method of claim 8, wherein said step of ensuring a solids content of the organic waste material of at least approximately 30% comprises adding an alkaline material to the organic waste material.

15. The method of claim 14, wherein the alkaline material is selected from a group including CaO and NaOH.

16. The method of claim 14, wherein the alkaline material is added in a quantity sufficient to achieve said raising of the pH level of the organic waste material.

17. The method of claim 8, further comprising the step of mechanically mixing the organic waste material and the mineral byproduct.

18. The method of claim 17, wherein said step of mechanically mixing the organic waste material and the mineral byproduct further comprises producing a granular, homogenous mixture.

19. The method of claim 18, wherein said step of mechanically mixing the organic waste material and the mineral byproduct further comprises producing a mixture that exhibits substantially-reduced odor and substantially-improved handling and storage characteristics.

20. The method of claim 8, further comprising increasing the temperature of the organic waste material.

21. The method of claim 20, wherein the temperature increase enables said method to be performed using a solids content of less than approximately 30%.

22. The method of claim 20, wherein the temperature increase enables said method to be performed using a pH level of less than approximately 9.5.

23. The method of claim 20, wherein the temperature increase enables said method to be performed using a solids content of less than approximately 30% and a pH level of less than approximately 9.5.

24. A method for treating organic waste material containing endogenous ammonia, wherein said method reduces $E. coli$ levels to less than $3.3*10^2$ colony forming units/gram (dry weight), reduces Salmonella levels to less than $6.7*10^2$ colony forming units/gram (dry weight), and significantly reduces levels of viruses and parasites in the organic waste material, said method comprising the steps of:

increasing a solids content of the organic waste material to at least approximately 30% to create air-filled pore space within the organic waste material;

increasing a pH level of the organic waste material to approximately 9.5 to convert a portion of the endogenous ammonia to gaseous ammonia; and retaining a substantial portion of the gaseous ammonia within the pore space for a period of at least approximately one hour, the pH level of the organic waste material remaining at approximately 9.5 during said period.

25. A method for treating organic waste material, wherein said method reduces $E. coli$ levels to less than $3.3*10^2$ colony forming units/gram (dry weight), reduces Salmonella levels to less than $6.7*10^2$ colony forming units/gram (dry weight), and significantly reduces levels of viruses and parasites in the organic waste material, said method comprising the steps of:

increasing the solids content of the organic waste material to at least approximately 30%; and raising the pH level of the organic waste material to approximately 9.5, wherein the solids content and pH level of the organic waste material cause endogenous ammonia to be converted to gaseous ammonia, a substantial portion of which is retained in pore space within the organic waste material for a period of at least approximately one hour.

* * * * *